United States Patent
Lininger et al.

(10) Patent No.: US 9,416,584 B2
(45) Date of Patent: Aug. 16, 2016

(54) METHOD AND DEVICE FOR SEALING INSULATING GLASS BLANKS

(71) Applicant: LISEC AUSTRIA GMBH, Seitenstetten (AT)

(72) Inventors: Markus Lininger, Neuhofen/Ybbs (AT); Alexander Kronsteiner, Blindenmarkt (AT); Mario Eder, Neumarkt (AT)

(73) Assignee: LISEC AUSTRIA GMBH, Seitenstetten (AT)

( * ) Notice: Subject to any disclaimer, the term of this patent is extended or adjusted under 35 U.S.C. 154(b) by 158 days.

(21) Appl. No.: 14/350,459

(22) PCT Filed: Jun. 28, 2013

(86) PCT No.: PCT/AT2013/000109
§ 371 (c)(1),
(2) Date: Apr. 8, 2014

(87) PCT Pub. No.: WO2014/000002
PCT Pub. Date: Jan. 3, 2014

(65) Prior Publication Data
US 2014/0251525 A1    Sep. 11, 2014

(30) Foreign Application Priority Data
Jun. 29, 2012    (AT) .................................. A 731/2012

(51) Int. Cl.
*B32B 41/00*    (2006.01)
*E06B 3/673*    (2006.01)
(Continued)

(52) U.S. Cl.
CPC ........... *E06B 3/67343* (2013.01); *B05B 12/004* (2013.01); *B05C 5/0216* (2013.01);
(Continued)

(58) Field of Classification Search
CPC .. B05C 5/0216; B05C 11/10; B05C 11/1002; B05C 11/1013; B05B 12/004; C03C 17/002; C03C 27/06; E06B 3/6733; E06B 3/67343

USPC .......... 156/64, 109, 350, 356, 360, 367, 378, 156/379; 118/688, 692; 264/40.3, 40.5; 425/146, 149, 170
See application file for complete search history.

(56) References Cited

U.S. PATENT DOCUMENTS 5,985,069 A    11/1999    Kawabe et al.

FOREIGN PATENT DOCUMENTS

EP    0 562 430 A2    9/1993
FR    2 560 813 A1    9/1985

OTHER PUBLICATIONS

International Search Report, dated Nov. 26, 2013, from corresponding PCT application.

(Continued)

*Primary Examiner* — Michael N Orlando
*Assistant Examiner* — Joshel Rivera
(74) *Attorney, Agent, or Firm* — Young & Thompson

(57) ABSTRACT

A method for sealing insulating glass blanks (1), in which a sealing compound (3) is introduced from a sealing nozzle (7) into the outwardly open edge joint (2) of the insulating glass blank (1). A material tongue (15) of the sealing compound (3) emerging from the sealing nozzle (7) forms in front of the sealing nozzle (7). The size of the material tongue (15) is proportional to the amount of the sealing compound (3) introduced into the edge joint (2) per unit of time. Sealing is controlled in accordance with the length of the material tongue (15) detected by a sensor (10). In particular the amount of sealing compound (3) introduced per unit of time to the sealing nozzle (7) and/or the relative speed between the insulating glass blank (1) and the sealing nozzle (7) is controlled in accordance with the length of the material tongue (15) detected by the sensor (10).

15 Claims, 1 Drawing Sheet

(51) Int. Cl.
*B05C 5/02* (2006.01)
*B05B 12/00* (2006.01)
*C03C 17/00* (2006.01)
*C03C 27/06* (2006.01)
*B05C 11/10* (2006.01)

(52) U.S. Cl.
CPC ............ *B05C 11/10* (2013.01); *B05C 11/1002* (2013.01); *B05C 11/1013* (2013.01); *C03C 17/002* (2013.01); *C03C 27/06* (2013.01); *E06B 3/6733* (2013.01)

(56) References Cited

OTHER PUBLICATIONS

AT Office Action, dated Jun. 29, 2012, from corresponding AT application.

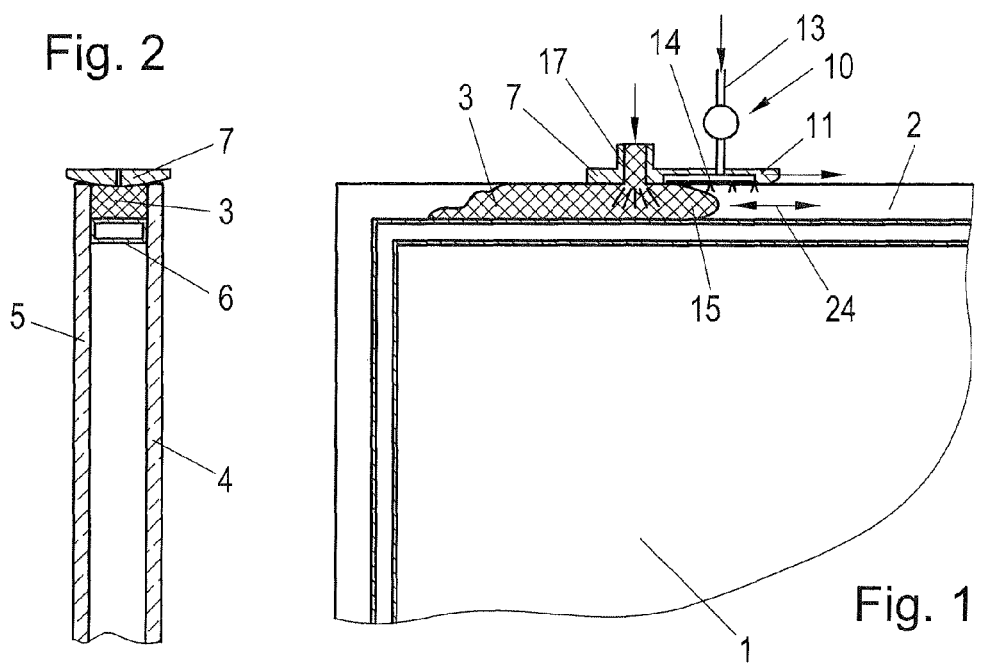
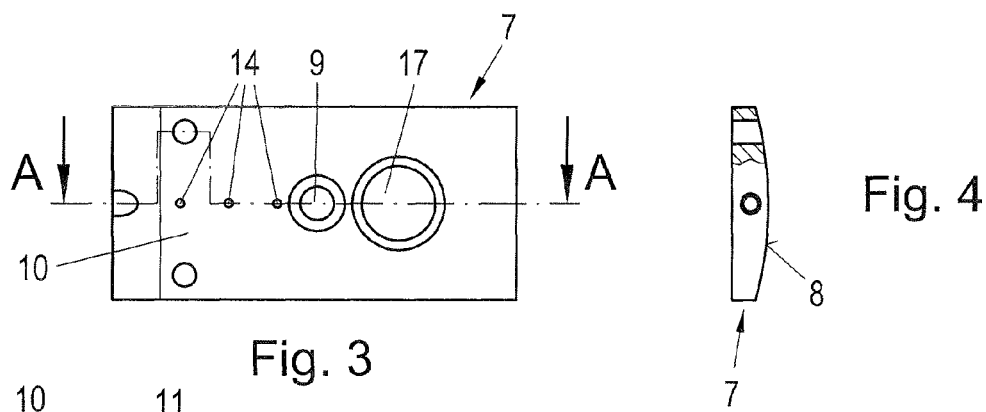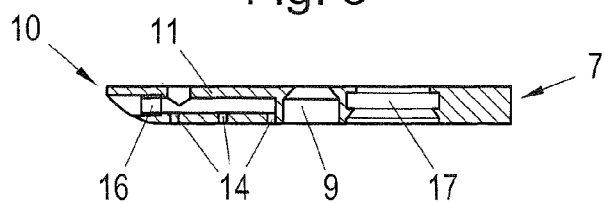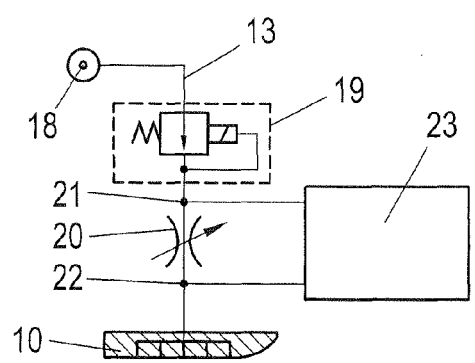

METHOD AND DEVICE FOR SEALING INSULATING GLASS BLANKS

BACKGROUND OF THE INVENTION

1. Field of the Invention

The invention relates to a method and a device with the features of the preambles of the independent claims aimed at the method and the device for implementing the method (cf. FR 2 560 813 A1).

2. Description of the Related Art

During production of insulating glass, the edge joint of insulating glass blanks bounded laterally by the edges of at least two glass panes and inwardly by the outside of the spacer is filled with sealing compound. The sealing compound produces the final edge bond of insulating glass, so that it is important that the sealing compound be introduced in the correct amount and in perfect form.

To control the sealing or to regulate the movements of the sealing nozzle (or several sealing nozzles) as well as to regulate the supply of sealing compound to the sealing nozzle, various methods are known, which all have the purpose of producing as uniform a sealing as possible with an accurately filled edge joint.

Not withstanding the above, the exact regulation of the sealing is difficult, since it is affected by many parameters, such as temperature, viscosity, compressibility, adhesion phenomena, etc.

FR 2 560 813 A shows a method and a device for sealing insulating glass blanks by means of a sealing nozzle, whereby to change the relative speed between sealing nozzle and insulating glass blank and/or to regulate the amount of sealing compound that is to be introduced by means of sensors, the size of a material tongue made of sealing compound that emerges in the direction of movement of the sealing nozzle is measured. Thus, in the case of FR 2 560 813 A1, the sealing is regulated based on the length of one of the tongues made of sealing compound that emerges from the sealing nozzle.

BRIEF SUMMARY OF THE INVENTION

The object of the invention is to make available a method and a device of the above-mentioned type with which the sealing of insulating glass blanks can be controlled easily and safely as well as reliably.

This object is achieved according to the invention with a method.

The object on which the invention is based is also achieved with a device that has the features of the independent claim that is aimed at the device and with which device the method according to the invention can be easily performed.

The invention is essentially based on detecting the length of the material tongue that is constructed in front of the sealing nozzle and that is made of sealing compound (sealing compound emerging from the sealing nozzle) and, building thereon, on regulating the sealing when an edge joint of insulating glass blanks is sealed.

Such a material tongue that is made of sealing compound and that forms in the direction of movement in front of the sealing nozzle forms in particular in the sealing nozzles that do not plunge into the edge joint, whereby these nozzles usually have a spherical, namely convex, surface that is in the shape of a partial cylinder barrel and that faces the edge joint, with which they slide onto the inside edges of the two glass panes, which laterally bound the edge joint.

Detecting the length of the material tongue in front of the sealing nozzle makes it possible to determine immediately the overfeeding or underfeeding of the sealing compound in relation to the speed of movement of the sealing nozzle relative to the insulating glass blank.

By correcting the amount of sealing compound fed per unit of time to the sealing nozzle and/or by changing the relative speed between sealing nozzle and insulating glass blank (increasing or reducing this speed), it can be achieved that the amount of sealing compound that is correct in each case is introduced into the edge joint, so that a proper sealing of the edge joint of insulating glass blanks is achieved.

In the invention, as a dimension of the material tongue, the length of the material tongue in front of the sealing nozzle is detected.

This is done by acquiring data from a gas stream, e.g., compressed air, which is fed to one of the sealing nozzles relative to sensors placed in front relative to its predetermined direction of movement.

Data from the gas stream acquired within the framework of the invention are, for example, flow rates and pressures in the gas stream as well as oscillations in the gas stream, which are produced in particular after the gas stream exits from the sensor.

In the area of the sensor facing the edge joint, which can be designed in one piece, for example with the holding device of the nozzle, two or more hole-like outlet openings, which are open in the edge joint and which are arranged in a series that is oriented parallel to the edge joint that is to be filled, i.e., parallel to the provided direction of movement of the sealing nozzle, are provided. Instead of hole-like outlet openings, a slot-shaped outlet opening, which is oriented parallel to the edge joint, can be provided.

Depending on the length of the material tongue that is made of sealing compound, two or more of the hole-like openings or a larger or smaller area of the slot-shaped opening is/are covered, so that a change is produced in the cross-sectional area that is available for the exit of the gas stream, fed to the sensor, from the sensor. Thus, by measuring the flow of the gas stream, the dimension, in particular the length of the material tongue that is made of sealing compound, can be deduced by a measurement of differential pressure by means of a choke or by a measurement of the dynamic pressure.

With the compressed gas supply and with the size of the cross-sectional area that is available for the discharge of gas, the pneumatically-operating sensor provided according to the invention detects the length of the material tongue that is made of the sealing compound that emerges from the nozzle in a more exact and problem-free manner than the infrared sensor known from FR 2 560 813 A1 with transmitters and receivers.

BRIEF DESCRIPTION OF THE DRAWINGS

Other details and features of the invention follow from the description below of a preferred embodiment of a sensor with an application nozzle and two examples of use. Here:

FIG. 1 shows, in schematic form, a sealing nozzle with a sensor assigned to an edge joint of an insulating glass blank, FIG. 2 shows a side view (cutaway) in FIG. 1, FIG. 3 shows the nozzle with sensors seen from its surface facing the insulating glass blank, FIG. 4 shows a side view (partial cutaway) in this respect, FIG. 5 shows a section along the line A-A in FIG. 3, and FIG. 6 shows the principle of the measurement of flow by means of the determination of the differential pressure.

DETAILED DESCRIPTION OF THE PREFERRED EMBODIMENTS

An insulating glass blank 1, whose edge joint 2 is to be filled with sealing compound 3 (sealing of the insulating glass blank 1), consists, in the embodiment shown, of two glass panes 4, 5 and a spacer 6, joined in-between, which connects the separated glass panes 4, 5 to one another. During sealing, sealing compound 3 is filled into the outwardly open edge joint 2, and said compound enters into the edge joint 2, in particular is injected, from a sealing nozzle 7.

In the embodiment that is shown, as in particular FIG. 2 shows, a spherical sealing nozzle 7 is provided, i.e., a sealing nozzle 7 whose surface 8 facing the edge joint 2 is convex-curved in the manner of a partial cylinder barrel. In the sealing nozzle 7, an outlet opening 17 is provided for sealing compound 3, which is fed to the sealing nozzle 7 by means of lines, not shown, from supply drums via pipes and the like.

In the embodiment that is shown, a sensor 10 is assigned to the sealing nozzle 7 and is made in one piece with the body of the sealing nozzle 7. The sensor 10 comprises a body 11, in which a hollow space 12 is provided. Gas, e.g., compressed air, is fed into the hollow space 12 via a line 13. In the embodiment that is shown, the hollow space 12 in the sensor 10 is open in the direction toward the edge joint 2 through several hole-like openings 14, so that the gas that is injected into the hollow space 12 can exit again via the openings 14.

Instead of the hole-like openings 14, a slot-shaped opening can be provided for gas to exit from the hollow space 12 in the sensor 10. Both the number of openings 14 and the slot are oriented parallel to the edge joint 2 and parallel to the specified direction (arrow 24 in FIG. 1) of the relative movement between sealing nozzle 7 and insulating glass blank 1.

During the filling of the edge joint 2 relative to the movement of the sealing nozzle 7 in front of the sealing nozzle 7, FIG. 1 shows that a material tongue 15 is made from sealing compound 3 that emerges from the sealing nozzle 7. The size of the material tongue 15 is proportional to the fill level, i.e., it depends on the amount of sealing compound 3 that is introduced into the edge joint 2.

The invention is now based on the finding that the size, in particular the length, of this material tongue 15 can be used in this respect to be able to control the sealing so that notwithstanding the other parameters (relative speed between sealing nozzle 7 and insulating glass blank 1, depth and/or width of the edge joint, and other parameters, such as temperature, viscosity, compressibility of the sealing compound, adhesion phenomena of the sealing compound on the glass panes or the spacer), the correct amount of sealing compound 3 is introduced into the edge joint 2.

When the length of the material tongue 15 is detected, the pneumatically-operating sensor 10, designed as described above, operates as follows:

One or more of the openings 14 of the hollow space 12 in the sensor is/are covered by the material tongue 15, depending on the length thereof, so that the cross-sectional area that is available for the discharge of the gas stream, fed to the hollow space 12 of the sensor 10, from the sensor 10 is reduced, and the flow ratios in the fed gas stream are altered.

By means of a measurement of flow and/or a measurement of differential pressure via a choke and/or by means of a measurement of dynamic pressure, the length of the material tongue 15, i.e., its extension seen in the direction of movement in front of the sealing nozzle 7, can be detected, and an overfeeding or underfeeding can be deduced therefrom. From the result of detecting the length of the material tongue 15, information can be derived for the regulation of the sealing process, which supports data measured directly at the end of the process chain (i.e., in the edge joint that is to be filled).

In the embodiment of a sealing nozzle 7 shown in FIGS. 3 to 5, the sensor 10 is directly integrated into the sealing nozzle 7 by the hollow space 12 being formed by a hole whose end is closed with a plug 16, whereby three outlet openings 14 leading to the spherical side 8 of the sealing nozzle 7 are provided. The sealing nozzle 7 itself is equipped with an opening 9 for its fastening to a nozzle head, and an opening 17 is provided, through which sealing compound 3 is fed.

In FIG. 6, the measurement of the amount of flow of gas by the sensor 10 by means of a differential pressure is depicted as an example of a function of the ("pneumatic") sensor 10 assigned to the sealing nozzle 7. Gas, e.g., compressed air, is fed to the sensor 10 from a gas source 18 via the line 13. An electrically adjustable pressure regulator 19 is provided in the line 13. In addition, a choke 20, in particular an adjustable choke, is provided in the line. Connectors 21, 22 for a system 23 for measuring differential pressure 23 are connected in front of and behind the choke 20 so that the dynamic pressure can be measured by means of the choke 20.

Also, the data of the gas stream acquired during the method according to the invention are defined as oscillations that are produced during the entry of the gas stream (flowing-out of the gas stream from the sensor 10) into the edge joint 2 (noise emission).

In the gas stream, which enters into the space bounded by the spacer 6, the glass panes 4 and 5, as well as by the sensor 11, which space is closed on one side by the front end of the material tongue 15 and is open on the end, oscillations are produced in the above-mentioned space in the area of the gas stream that is located there.

These oscillations depend on the length (determined by the size of the material tongue 15) of the space (smaller space, short-wave oscillations, bigger space, long-wave oscillations). Thus, the wavelength/frequency of the oscillations of the gas stream in the space in front of the end of the material tongue 15 is a measurement of the size of the material tongue 15 that is made of sealing compound. The oscillations of the air column (in general a whistling tone, which consists of a base tone and overtones) are detected by a sound sensor (microphone). When the tone level detected by the microphone corresponds to a desired size (length) of the material tongue 15, the sealing is done correctly. If the tone level is too low or too high, parameters of the sealing (as further mentioned above) are to be altered so that the size (length) of the material tongue 15 corresponds to the correct amount of sealing compound introduced into the edge joint 2.

In summary, an embodiment of the invention can be described as follows.

During sealing of insulating glass blanks, sealing compound is introduced from a sealing nozzle into the outwardly open edge joint of the insulating glass blank. In this case, a material tongue that is made of sealing compound emerging from the sealing nozzle is formed in front of the sealing nozzle. The size of the material tongue is proportional to the amount of sealing compound introduced per unit of time in the edge joint. The sealing is controlled based on the length of the material tongue detected by a sensor. In this case, in particular the amount of sealing compound fed per unit of time to the sealing nozzle and/or the relative speed between the insulating glass blank and the sealing nozzle is/are regulated based on the length of the material tongue that is detected by the sensor.

The invention claimed is:

1. A method for sealing insulating glass blanks, the method comprising:
   introducing, from at least one sealing nozzle, a sealing compound into an outwardly open edge joint of the insulating glass blank, a relative movement being carried out between the sealing nozzle and the insulating glass blank;

measuring the length of a material tongue that is made of sealing compound forming sealing compound emerging in front of the sealing nozzle through the sealing nozzle by feeding a gas stream to a sensor, which is disposed in front of the sealing nozzle relative to the predetermined direction of movement of the sealing nozzle, data of the gas stream, which changes because of the change of the cross-sectional area, which is available for the discharge of the gas stream, fed to the sensor, from the sensor and which depends on the length of the material tongue that is made of sealing compound emerging from the sealing nozzle, being acquired; and regulating the supply of the sealing compound to the sealing nozzle and/or the relative speed between the sealing nozzle and the insulating glass blank based on the detected length of the material tongue.

2. The method according to claim 1, wherein compressed air is fed to the sensor as gas.

3. The method according to claim 1, wherein the data of the gas stream are acquired by measurement of the flow of the gas stream, by measurement of a differential pressure via a choke, or by measurement of a dynamic pressure.

4. The method according to claim 1, wherein when the gas stream enters from the sensor into the space that is bounded by a spacer, the glass panes, the sensor, and on one end by the material tongue, the resulting oscillations are detected in the gas stream and are compared to a preset value.

5. The method according to claim 4, wherein the oscillations are detected by a sound sensor.

6. A device for carrying out the method according to claim 1, the device comprising:
the at least one sealing nozzle; and
systems for carrying out the relative movement between the sealing nozzle and the insulating glass blank with the sensor assigned to the sealing nozzle to detect the size of the material tongue, which the sensor is being provided relative to the direction of movement of the sealing nozzle relative to the insulating glass blank in front of the sealing nozzle, the sensor having a hollow space, in which a line configured to supply pressurized gas ends, at least two hole-like openings that are open toward the edge joint or a slot-shaped opening running in the longitudinal direction of the edge joint being provided in the surface of the sensor facing the edge joint.

7. The device according to claim 6, wherein the sensor is connected to the sealing nozzle.

8. The device according to claim 6, wherein a device configured to measure the amount of flow is assigned to the supply line for gas to the sensor.

9. The device according to claim 6, wherein a system for measurement of differential pressure and a choke provided in the line are assigned to the line for supplying gas to the sensor.

10. The device according to claim 6, wherein a system for measuring dynamic pressure is assigned to the line for supplying gas to the sensor.

11. The device according to claim 7, wherein a device for measuring the amount of flow is assigned to the supply line for gas to the sensor.

12. The device according to claim 7, wherein a system for measurement of differential pressure and a choke provided in the line are assigned to the line for supplying gas to the sensor.

13. The device according to claim 7, wherein a system for measuring dynamic pressure is assigned to the line for supplying gas to the sensor (10).

14. The method according to claim 2, wherein the data of the gas stream are acquired by measurement of the flow of the gas stream, by measurement a differential pressure via a choke, or by measurement of a dynamic pressure.

15. The method according to claim 2, wherein when the gas stream enters from the sensor into the space that is bounded by a spacer, the glass panes, the sensor, and on one end by the material tongue, the resulting oscillations are detected in the gas stream and are compared to a preset value.

\* \* \* \* \*